United States Patent
Kim et al.

(10) Patent No.: US 8,965,467 B2
(45) Date of Patent: Feb. 24, 2015

(54) SUPERCONDUCTING ROTATING ELECTRICAL MACHINE AND MANUFACTURING METHOD FOR HIGH TEMPERATURE SUPERCONDUCTING FILM THEREOF

(71) Applicant: Doosan Heavy Industries & Construction Co., Ltd., Changwon-si, Gyeongsangnam-do (KR)

(72) Inventors: Yeong Chun Kim, Changwon-si (KR); Jin Hong Joo, Changwon-si (KR); Tae Sun Moon, Buk-gu (KR); Heui Joo Park, Gimhae-si (KR); Woon Sik Kwon, Changwon-si (KR); Jung Hyun Lee, Changwon-si (KR); Hyo Jung Kim, Changwon-si (KR); Jae Deuk Lee, Changwon-si (KR); Sung Hwan Lim, Changwon-si (KR)

(73) Assignee: Doosan Heavy Industries & Construction Co., Ltd., Chanwon-si (KR)

( * ) Notice: Subject to any disclaimer, the term of this patent is extended or adjusted under 35 U.S.C. 154(b) by 140 days.

(21) Appl. No.: 13/772,997

(22) Filed: Feb. 21, 2013

(65) Prior Publication Data

US 2013/0225415 A1 Aug. 29, 2013

(30) Foreign Application Priority Data

Feb. 24, 2012 (KR) .......... 10-2012-0019350
Mar. 22, 2012 (KR) .......... 10-2012-0029575

(51) Int. Cl.
*H01F 6/06* (2006.01)
*H02K 9/00* (2006.01)
(Continued)

(52) U.S. Cl.
CPC ............. *H02K 9/005* (2013.01); *H02K 55/04* (2013.01); *H02K 3/24* (2013.01); *Y02E 40/625* (2013.01)
USPC .......................... 505/163; 505/300

(58) Field of Classification Search
CPC ...................... H01F 6/065; G01R 33/3815
See application file for complete search history.

(56) References Cited

U.S. PATENT DOCUMENTS 5,774,032 A 6/1998 Herd et al.
(Continued)

FOREIGN PATENT DOCUMENTS

JP 06-133532 A 5/1994
(Continued)

OTHER PUBLICATIONS

International Search Reported dated May 31, 2013 issued in corresponding PCT application No. PCT/KR2013/001197.

*Primary Examiner* — Colleen Dunn
(74) *Attorney, Agent, or Firm* — Sughrue Mion, PLLC

(57) ABSTRACT

The present disclosure relates to a superconducting rotating electrical machine and a manufacturing method for a high temperature superconducting film thereof. The superconducting rotating electrical machine includes a stator, and a rotor rotatable with respect to the stator, the rotor having a rotary shaft and a rotor winding. Here, the rotor winding includes tubes disposed on a circumference of the rotary shaft and each forming a passage for a cooling fluid therein, superconducting wires accommodated within the tubes, and a cooling fluid flowing through the inside of the tubes. This configuration may allow for direct heat exchange between the superconducting wires and a refrigerant, resulting in improvement of heat exchange efficiencies of the superconducting wires.

17 Claims, 11 Drawing Sheets

(51) Int. Cl.
*H02K 55/04* (2006.01)
*H02K 3/24* (2006.01)

(56) References Cited

U.S. PATENT DOCUMENTS 7,816,826 B2 10/2010 Gromoll
2005/0248222 A1* 11/2005 Evangelos et al. .............. 310/54

2009/0315425 A1 12/2009 Zhang et al.

FOREIGN PATENT DOCUMENTS

| JP | 2675030 B2 | | 7/1997 |
| JP | 10-136609 | * | 5/1998 |
| JP | H10-136609 A | | 5/1998 |
| KR | 10-0801639 B1 | | 2/2008 |

* cited by examiner

SUPERCONDUCTING ROTATING ELECTRICAL MACHINE AND MANUFACTURING METHOD FOR HIGH TEMPERATURE SUPERCONDUCTING FILM THEREOF

CROSS-REFERENCE TO RELATED APPLICATION

The present disclosure relates to subject matter contained in priority Korean Application Nos. 10-2012-0019350 and 10-2012-0029575, filed on Feb. 24, 2012 and Mar. 22, 2012, which are herein expressly incorporated by reference in their entireties.

BACKGROUND OF THE INVENTION

1. Field of the Invention

This specification relates to a superconducting rotating electrical machine and a manufacturing method for a high temperature superconducting film thereof, and particularly, to a superconducting rotating electrical machine, capable of preventing deformation of components and improving cooling efficiency, and a manufacturing method for a high temperature superconducting film thereof.

2. Background of the Invention

As widely known, a rotating electrical machine may be used exclusively as a generator for converting mechanical energy into electrical energy or a motor for converting electrical energy into mechanical energy or used as combination of both the generator and the motor.

In general, the rotating electrical machine may include a stator and a rotor rotatable with respect to the stator.

A so-called superconducting rotating electrical machine using superconducting wires has been introduced. The machine may remarkably reduce a loss, compared with a normal conducting rotating electrical machine using copper wires.

As compared with the normal conducting rotating electrical machine, the superconducting rotating electrical machine, as well known, may have a remarkably increased capacity when having the same size, and have a remarkably reduced size when having the same capacity.

FIG. 1 is a side view of a rotor for a superconducting rotating electrical machine according to the related art, and FIG. 3 is a sectional view showing main parts of FIG. 1.

As shown in FIGS. 1 and 2, a superconducting rotating electrical machine may include a stator (not shown), and a rotor 10 disposed to be rotatable with respect to the stator.

The rotor 10 may include a rotary shaft 20, and a rotor winding 30 disposed on a circumference of the rotary shaft 20.

The rotor winding 30 may include a superconducting wire as a conducting wire.

The rotor winding 30, for example, may be configured by winding the superconducting wire in a circumferential direction.

The rotor winding 30 may have a so-called racetrack shape or oval shape.

The rotor winding 30 may be provided in plurality.

The rotary shaft 20 may include a mounting portion 25 formed on a circumference thereof such that the rotor winding 30 is mounted thereon.

A rotor winding support cover 40 for supporting the rotor winding 30 may be detachably coupled to the mounting portion 20.

The rotary shaft 20 may be provided therein with a refrigerant storing space 22. This may allow the rotor winding 30 to be cooled.

The rotor 10 may include an enclosure 50 defining an accommodating space therein.

The inside of the enclosure 50 may be maintained in a vacuum state.

The rotor winding 30 and a part of the rotary shaft 20 may be accommodated within the enclosure 50.

The superconducting rotating electrical machine according to the related art has the so-called racetrack-shaped rotor winding 30 that a superconducting wire long in length is wound in a circumferential direction and pressed to have an extended length in one direction. With the configuration, upon constituting an intermediate capacity device and/or a large capacity device, which have a relatively larger capacity than a small capacity device, a linear section of the rotor winding 30 may be deformed due to being bent (drooped) by its own weight.

In addition, the rotor winding 30 is disposed on an outer surface of the rotary shaft 20. A refrigerant is supplied into the rotary shaft 20 to cool the rotor winding 30 by heat conduction using the rotary shaft 20 as an intermediate. This may cause the rotor winding 30 to be insufficiently cooled (i.e., lowering of cooling efficiency).

In the meantime, a superconductor may allow a large quantity of current to flow without loss. The superconductor refers to a material which is used to make powerful magnets so as to be applied to various fields, such as a magnetic levitation train, a magnetic resonance image (MRI) scanner and the like. The superconductor exhibits a specific magnetic property which is not found in the conventional metals or conductors. Accordingly, the use of the superconductor allows for developing sensors and electronic devices having ultra sensitivities, super high speeds and super high efficiencies which cannot be implemented by the related art devices.

Among those superconductors, a high temperature superconductor exhibits superconducting properties at temperature higher than 77K, which is the boiling point of liquid nitrogen. Therefore, as compared to a low temperature superconductor, it has the advantage in low costs in the aspect of using the liquid nitrogen as a refrigerant.

The high temperature superconductor exists in the form of an oxide. This makes it easy for cracks to be generated on the superconductor due to the lack of ductility. Hence, a high temperature superconducting film which the high temperature superconductor is deposited on a metallic substrate having high malleability or ductility in the form of a thin film may overcome the problem, and have properties superior to general metallic wires. This thusly leads to many studies and development thereof.

FIG. 3 shows a general high temperature superconducting film. As shown in FIG. 3, a high temperature superconducting film 70 has a structure of laminating a buffer layer 72 on a metal substrate 71, and laminating a superconducting layer 73 on the buffer layer 72.

The buffer layer 72 is employed to deposit a ceramic superconducting layer on the metallic substrate, and is a multi-layered oxide layer having a layered structure. The oxide layer is laminated by being deposited on the metallic substrate.

A cap layer 74 and a stabilizer layer 75 are located on the superconducting layer 73. The cap layer 74 is laminated by depositing a metal layer such as silver (Ag) or the like. The stabilizer layer 75 is formed of a metal different from the superconducting layer 73, and serves to protect the superconducting film by allowing a current higher than a threshold current to flow to the stabilizer when the current flows on the superconductor. Also, another stabilizer layer 76 may also be disposed beneath the metallic substrate. FIG. 3 shows a stabilizer layer made of copper (Cu).

Referring to FIG. 3, the high temperature superconducting film has the multi-layered structure. Here, the superconducting layer 73 is formed in the shape of the ceramic thin film which has no elasticity. Consequently, in view of its properties, cracks are easily generated when a mechanical stress is applied thereto.

In particular, cracks are very likely to be generated on the superconducting layer deposited on the metallic substrate due to bending of the metallic substrate which inevitably occurs during processing on the metallic substrate. In the current structure of the high temperature superconducting film, the metallic substrate is the thickest, accordingly, the mechanical stress due to the bending of the metallic substrate is transferred directly to the superconducting layer.

This results in degradation of a current carrying capability of the superconducting layer which allows a high current to flow within a narrow area.

SUMMARY OF THE INVENTION

Therefore, an aspect of the detailed description is to provide a superconducting rotating electrical machine capable of improving heat exchange efficiencies of superconducting wires by virtue of direct heat exchange between the superconducting wires and a refrigerant.

Another aspect of the detailed description is to provide a superconducting rotating electrical machine capable of preventing deformation of superconducting wires.

Another aspect of the detailed description is to provide a superconducting rotating electrical machine having high temperature superconducting films, capable of preventing deterioration of the superconducting films caused due to bending of a metal substrate, and a manufacturing method for a high temperature superconducting film thereof.

Another aspect of the detailed description is to provide a superconducting rotating electrical machine having high temperature superconducting films, capable of preventing cracks from being generated on a superconducting layer by maintaining a flat state of a metal substrate in a manner of adjusting thickness and arrangement of stabilizer layers upon manufacturing the high temperature superconducting film, and a manufacturing method for a high temperature superconducting film thereof.

To achieve these and other advantages and in accordance with the purpose of this specification, as embodied and broadly described herein, there is provided a superconducting rotating electrical machine including a stator, and a rotor rotatable with respect to the stator and having a rotary shaft and a rotor winding. Here, the rotor winding may include tubes disposed on a circumference of the rotary shaft and each forming a passage for a cooling fluid therein, superconducting wires accommodated within the tubes, and a cooling fluid flowing through the inside of the tubes.

Here, the rotor winding may include spacers located within the tubes to space the superconducting wires apart from one another.

Each of the spacers may include through holes to allow the cooling fluid to flow therethrough.

The rotor winding may include a tube supporting unit to support the tubes with spacing the tubes apart from the rotary shaft.

The tube supporting unit may be provided in plurality, and the plurality of tube supporting units may be arranged with predetermined intervals.

Each of the tube supporting units may include a supporter having a rotary shaft receiving hole for receiving the rotary shaft therein, and tube receiving portions formed on a circumference of the rotary shaft receiving hole for receiving the tubes therein, and a fixing member protruding from the circumference of the rotary shaft to fix the supporter.

The supporter may be made of a non-metallic substance (for example, glass fiber).

The superconducting rotating electrical machine may further include at least one cooling fluid supply pipe connected to each tube to supply the cooling fluid thereinto, and at least one cooling fluid collecting pipe connected to the other side of the tube to collect the cooling fluid.

The rotary shaft may form an inner accommodating space, and the cooling fluid supply pipe or the cooling fluid collecting pipe may be disposed within the rotary shaft.

The rotor may include an enclosure to accommodate a part of the rotary shaft and the rotor winding therein.

The rotary shaft may form an inner accommodating space, and include a first shaft portion located at a central portion thereof, and second shaft portions connected to both ends of the first shaft portion.

The first shaft portion may have an outer diameter greater than that of the second shaft portion.

The first shaft portion may include a cylindrical portion, and disk portions disposed on both ends of the cylindrical portion in a radial direction.

The rotor winding may be disposed on a circumference of the first shaft portion.

The superconducting wire may be implemented as a multi-layered high temperature superconducting film.

The high temperature superconducting film may include a superconducting layer, an upper layer having an upper stabilizer layer and a cap layer laminated on the superconducting layer, and a lower layer having a buffer layer and a metal substrate laminated beneath the superconducting layer. Here, the upper layer and the lower layer may have the same thickness.

The superconducting layer may be located in the middle between the upper layer and the lower layer such that the upper layer and the lower layer are symmetrical in thickness.

The lower layer may further include a lower stabilizer layer laminated beneath the metal substrate.

The buffer layer of the lower layer may be laminated adjacent to the superconducting layer below the superconducting layer, the metal substrate of the lower layer may be laminated beneath the buffer layer, and the lower stabilizer layer of the lower layer may be laminated beneath the metal substrate.

The cap layer of the upper layer may be laminated adjacent to the superconducting layer above the superconducting layer, and the upper stabilizer layer of the upper layer may be laminated on the cap layer.

To achieve these and other advantages and in accordance with the purpose of this specification, as embodied and broadly described herein, there is provided a method for manufacturing a multi-layered high temperature superconducting film for the superconducting rotating electrical machine the method including sequentially laminating a buffer layer and a superconducting layer on the metal substrate, laminating a cap layer on the superconducting layer, and laminating an upper stabilizer layer and a lower stabilizer layer on the cap layer and beneath the metal substrate, respectively. Here, the laminating of the stabilizer layers may be carried out to arrange the stabilizer layers by adjusting thicknesses of the stabilizer layers such that the sum of thicknesses of the upper stabilizer layer and the cap layer is the same as the sum of thicknesses of the buffer layer, the metal substrate and the lower stabilizer layer.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 4:
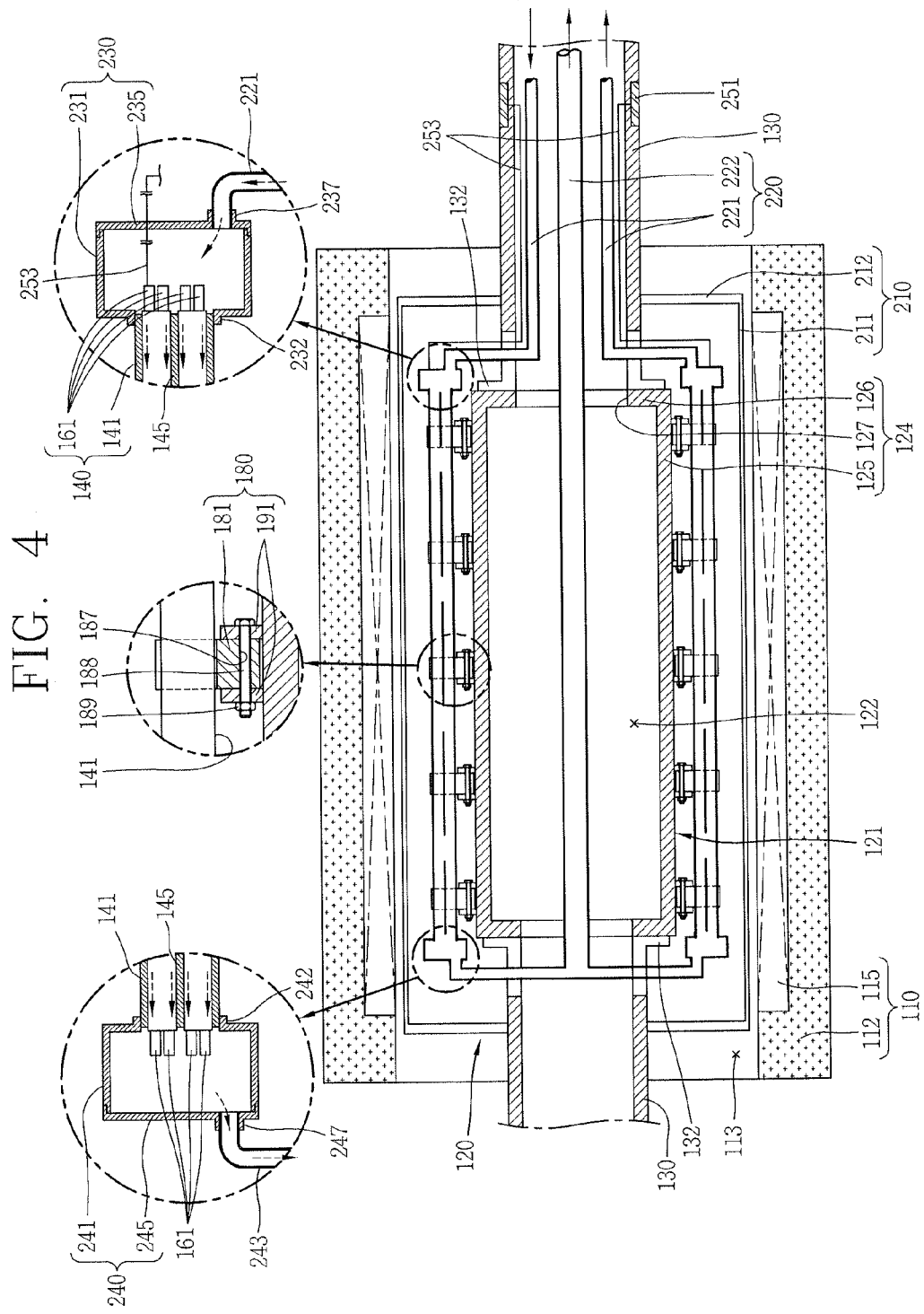
FIG. 4 is a sectional view of a superconducting rotating electrical machine in accordance with one exemplary embodiment of the present disclosure.
Figure 5:
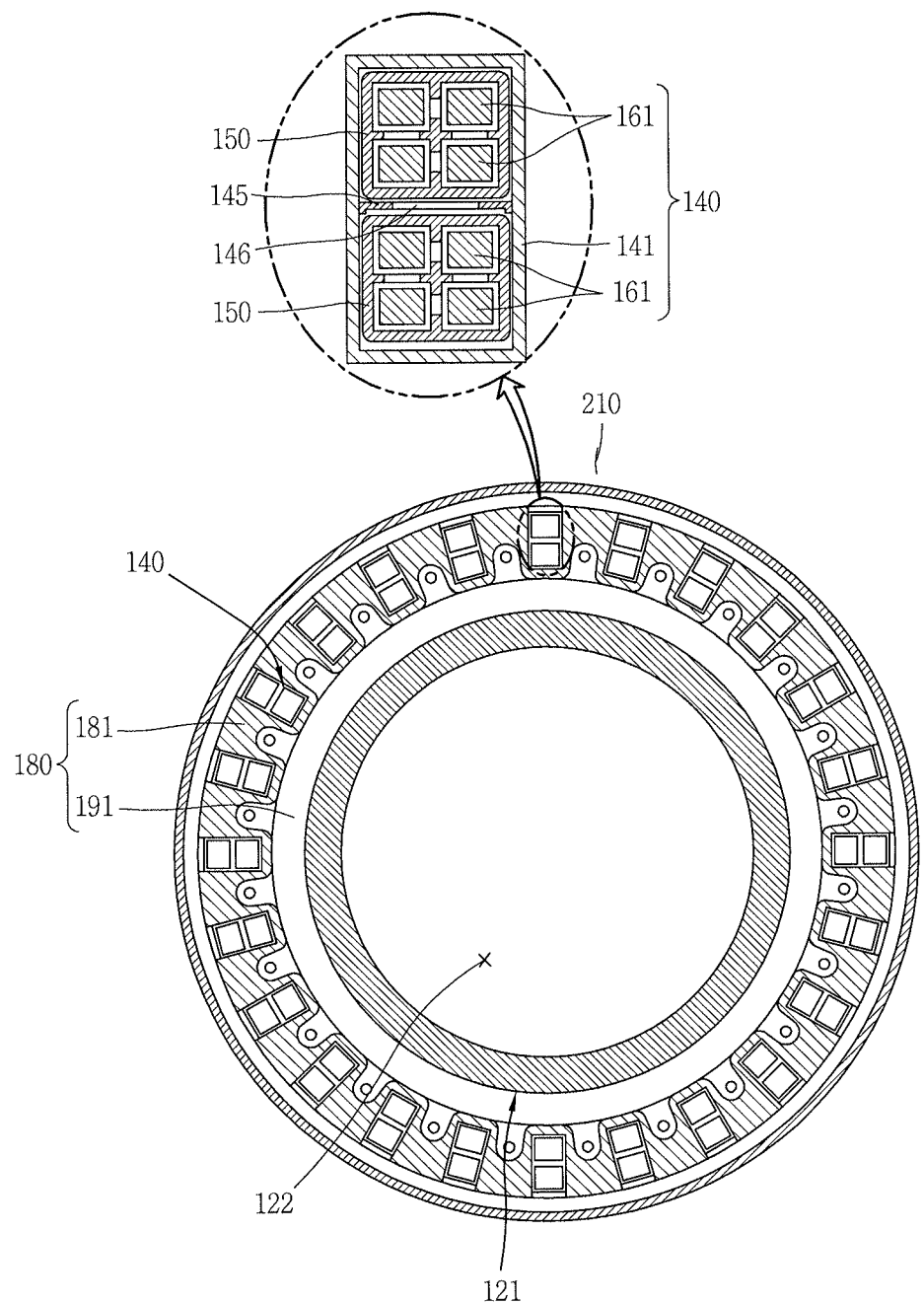
FIG. 5 is a sectional view of a tube supporting unit area of FIG. 4.

As shown in FIGS. 4 and 5, a superconducting rotating electrical machine in accordance with one exemplary embodiment may include a stator 110, and a rotor 120 having a rotary shaft 121 and a rotor winding 140 to be rotatable with respect to the stator 110. The rotor winding 140 may include tubes 141 disposed on a circumference of the rotary shaft 121 and each having a passage for cooling fluid therein, superconducting wires 161 accommodated within the tubes 141, and a cooling fluid flowing via the inside of the tubes 141. The superconducting rotating electrical machine according to the one exemplary embodiment may be implemented as one of a dedicated electric generator, a dedicated motor or a combination of generator and motor. Hereinafter, description will be given of an example that the superconducting rotating electrical machine is implemented as the (dedicated) generator.

The stator 110 may include a stator core 112, and a stator winding 115 wound on the stator core 112. The stator winding 115, for example, may be connected to a transmission/distribution system to supply power to a load.

A rotor receiving space 113 for rotatably receiving the rotor 120 therein may be formed within the stator core 112.

The rotor 120 may be rotatably disposed within the stator 110.

The rotor 120, for example, may include a rotary shaft 121, and a rotor winding 140 wound on a circumference of the rotary shaft 121.

The rotary shaft 121 may be connected to an external power source (for example, a thermal power turbine or a nuclear power turbine).

The rotary shaft 121, for example, may include an accommodating space 122 therein.

Bearings (not shown) for rotatably supporting the rotary shaft 121 may be disposed on both end portions of the rotary shaft 121.

The rotary shaft 121, for example, may include a first shaft portion 124, and second shaft portions 130 connected to both ends of the first shaft portion 124.

The rotary shaft 121 may be made of a non-magnetic substance (for example, stainless).

The first shaft portion 124, for example, may be greater in outer diameter than the second shaft portion 130.

The first shaft portion 124, for example, may include a cylindrical portion 125, and disk portions 126 disposed on both ends of the cylindrical portion 125 in a radial direction.

A penetrating portion 127 may be formed through a central region of each disk portion 126 such that inside and outside of the disk portion 127 can communicate with each other.

A flange 132 may be formed on one end of each of the second shaft portions 130. The flanges 132 may externally extend in a radial direction to be coupled to both ends of the first shaft portion 124 in a contact state.

The flanges 132 may contact the disk portions 126 and be integrally coupled thereto by coupling members (for example, bolts).

The rotor winding 140 may be disposed on the circumference of the rotary shaft 121.

In more detail, the rotor winding 140 may be disposed on a circumference of the first shaft portion 124 of the rotary shaft 121.

The rotor winding 140 may include tubes 141 disposed on the circumference of the rotary shaft 121 and each forming a passage for cooling fluid therein, superconducting wires 161 received within the tubes 141, and a cooling fluid flowing via the inside of the tubes 141. Here, the cooling fluid may be liquid nitrogen N or neon (Ne).

The tube 141, for example, may have a rectangular section.

The superconducting wires 161 may be disposed within the tube 141.

The superconducting wire 161, for example, may be made of a material having a rectangular section.

The tube 141, for example, may include a partition wall 145 for partitioning its inner space. Here, the partition wall 145 may also be a partition member which is fabricated separate from the tube 141 and inserted into the tube 141.

At least one through hole 146 may be formed at the partition wall 145. Accordingly, the cooling fluid may freely flow into the partitioned different spaces via the through hole 146, resulting in reduction of a temperature deviation inside the tube 141.

Spacers 150 may be disposed in the tube 141 such that the superconducting wires 161 are supported with being spaced apart from one another.

Figure 8:
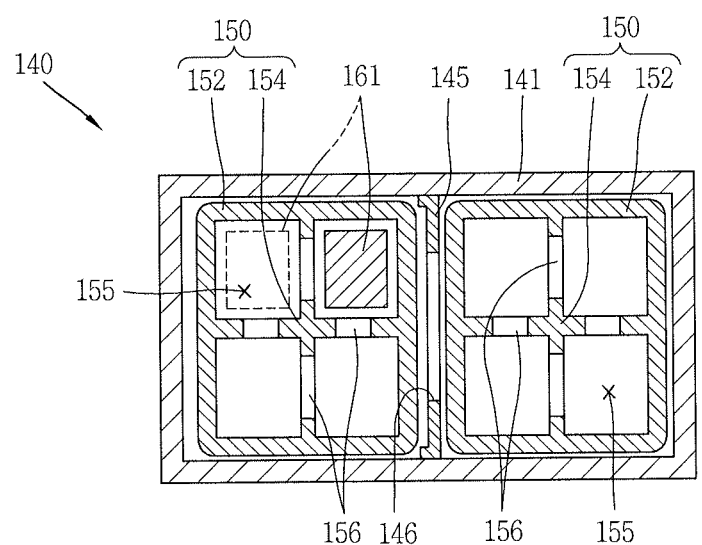
FIG. 8 is an enlarged sectional view of a tube shown in FIG. 7.

As shown in FIG. 8, each spacer 150, for example, may include an outer wall 152 defining an accommodating space 155 for the superconducting wires 161, and an inner wall 154 for partitioning the inner accommodating space 155 of the outer wall 152.

The superconducting wires 161 may be spaced from an inner surface of the tube 141 by the outer wall 152 of the spacer 150 and spaced from the other superconducting wires 161 by the inner wall 154.

Through holes 156 may be formed through plate surfaces of the inner wall 154. Accordingly, the cooling fluid may smoothly flow into the different accommodating spaces 155 partitioned by the inner wall 154 via the through holes 156. This may allow the superconducting wires 161 within the spacer 150 to be evenly cooled, thereby reducing the temperature deviation of the superconducting wires 161.

In the meantime, the rotor winding 140 may include a tube supporting unit 180 by which the tube 141 is supported with being spaced apart from the rotary shaft 121.

The tube supporting unit 180, for example, may be provided in plurality.

The plurality of tube supporting units 180 may be arranged in an axial direction with being spaced by a predetermined interval (installation interval). This may prevent the rotor winding 140 from being bent (drooped) or deformed. Also, since the tube supporting units 180 are disposed by the uniform installation interval even if the rotor winding 140 extends in length, the deformation of the rotor winding 140, for example, bending may effectively be prevented by increasing the number of the tube supporting unit 180.

The tube supporting unit 180 may include, for example, a supporter 181 having a rotary shaft receiving hole 183 for receiving the rotary shaft 121 therein and tube receiving portions 185 formed on a circumference of the rotary shaft receiving hole 183 for receiving the tubes 141, and a fixing member 191 protruding from the circumference of the rotary shaft 121 in a radial direction for supporting the supporter 181 in a fixed state.

The supporter 181 may be made of a non-metallic substance (for example, glass fiber).

In more detail, the supporter 181 may be formed as a single body having a preset thickness. Also, the supporter 181 may be formed to be relatively thin, so as to be laminated in an axial direction by a desired thickness for use.

Figure 6:
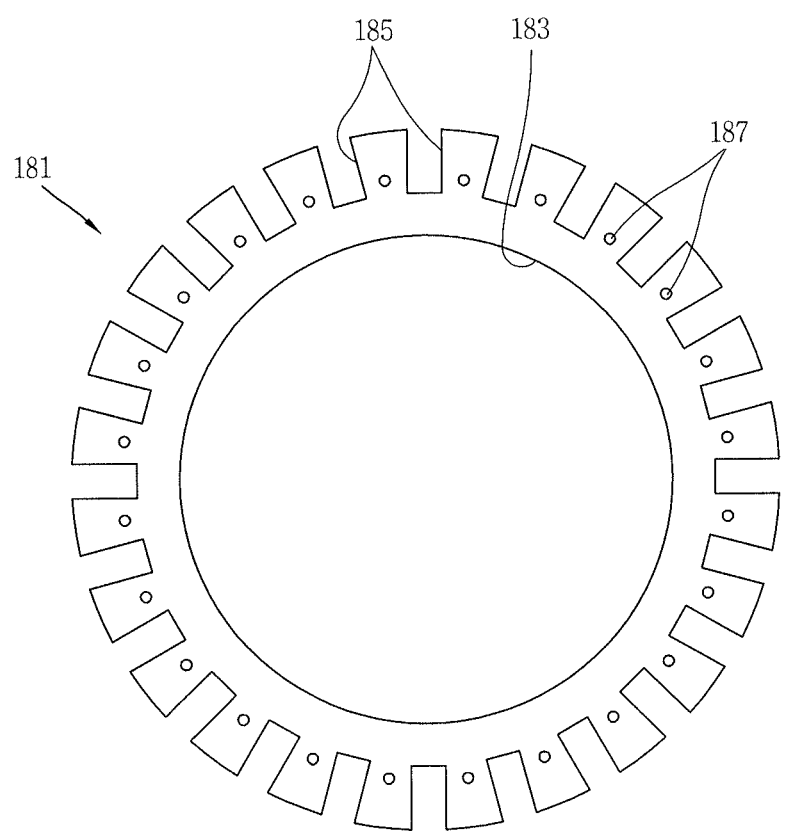
FIG. 6 is a front view of a supporter shown in FIG. 5.

The supporter 181, as shown in FIG. 6, may include the rotary shaft receiving hole 183 formed at a central portion thereof for receiving the rotary shaft 121 therein. Here, the rotary shaft receiving hole 183 may have an inner diameter greater than the outer diameter of the rotary shaft 121 (more particularly, the first shaft portion 124).

The supporter 181 may include the tube receiving portions 185 recessed into an outer circumference thereof in a radial direction. Each tube receiving portion 185 may be formed in a shape like 'U' so as to contact three surfaces of outer surfaces of the tube 141. The tube receiving portion 185 may be configured to contact a lower surface and both side surfaces of the tube 141.

The tube receiving portions 185 may be arranged with being spaced by predetermined intervals along a circumferential direction of the supporter 181.

A coupling member insertion hole 187, in which a coupling member 188 (for example, a bolt) coupled simultaneously to the fixing member 191 and the supporter 181 is inserted, may be formed between the tube receiving portions 185.

The coupling member insertion hole 187, for example, may be disposed between the adjacent tube receiving portions 185.

The fixing member 191 for fixing the supporter 181 onto the rotary shaft 121 may be disposed at one side or both sides of the supporter 181.

Figure 7:
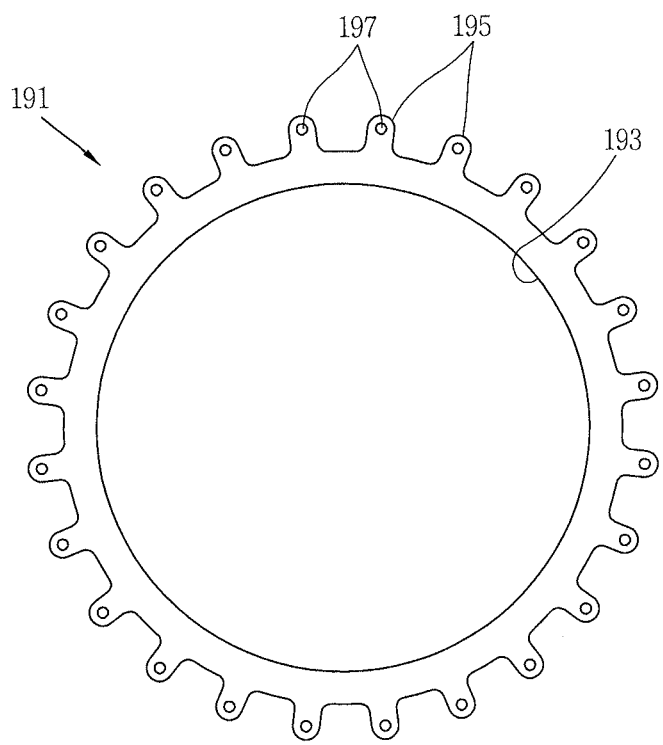
FIG. 7 is a front view of a fixing member shown in FIG. 4.

The fixing member 191, for example, may be formed in a shape like a circular ring, as shown in FIG. 7.

The fixing member 191 may be made of a metal, for example.

The fixing member 191, for example, may include a rotary shaft insertion hole 193 in which the rotary shaft 121 is inserted. The rotary shaft insertion hole 193 may be formed to be the same as or smaller than the outer diameter of the rotary shaft 121 (more particularly, the first shaft portion 124), so as to be coupled in a manner of shrink fitting, welding, key assembling and the like.

That is, the fixing member 191 may be integrally coupled to the rotary shaft 121 (i.e., the first shaft portion 124) in a welding or key assembling manner.

The fixing member 191 may include a plurality of protrusions 195 which protrude to the exterior in a radial direction and are spaced apart from one another in a circumferential direction.

A coupling member insertion hole 197 in which a coupling member 188 coupled simultaneously to the supporter 181 is inserted may be formed through each protrusion 195.

A screw 189 may be coupled to the coupling member 188.

In the meantime, the rotor 120 may include an enclosure 210 which accommodates therein a part of the rotary shaft 121 and the rotor winding 140.

The inside of the enclosure 210 may be maintained in a vacuum state. Accordingly, an introduction of external heat may be blocked, resulting in effective cooling of the superconducting wires 161.

The enclosure 210, for example, may include a cylindrical portion 211, and a blocking portion 212 for blocking both ends of the cylindrical portion 211.

The enclosure 210 may be formed to have an inner diameter greater than the maximum outer diameter of the tube 141 and the supporter 181.

The enclosure 210 may be configured such that both ends thereof can be disposed on the second shaft portions 130 of the rotary shaft 121.

A cooling fluid circulating unit 220 for allowing the cooling fluid to circulate via the rotor winding 140 may be disposed at one side of the rotor 120.

The cooling fluid circulating unit 220, for example, may include at least one cooling fluid supply pipe 221 connected to one side of each tube 141 to supply the cooling fluid thereinto, and at least one cooling fluid collecting pipe 222 connected to the other side of each tube 141 to collect the cooling fluid.

The cooling fluid circulating unit 220 may further include a cooling fluid distributer 230 connected to each tube 141 to distribute the cooling fluid.

The cooling fluid circulating unit 220 may include a cooling fluid collector 240 connected to each tube 141 to collect the cooling fluid.

The cooling fluid supply pipe 221 may be connected to the cooling fluid distributer 230.

The cooling fluid supply pipe 221, for example, may be provided in plurality.

The cooling fluid collecting pipe 222 may be connected to the cooling fluid collector 240.

The cooling fluid collecting pipe 222 may be formed as a pipe with a relatively great diameter.

The cooling fluid distributer 230 may be disposed at one side end of the rotor winding 140 (for example, at the right end in the drawing).

The cooling fluid distributer 230, for example, may have a shape of a circular tube which has an accommodating space for the cooling fluid therein.

The cooling fluid distributer 230, for example, may have a connection space therein such that the superconducting wires 161 drawn out of the tube 141 can be connected to one another therein. Accordingly, the superconducting wires 161 drawn out of the tube 141 may effectively be cooled.

The cooling fluid supply pipe 221 may be connected to the other side of the cooling fluid distributer 230 so as to communicate with the inside of the cooling fluid distributer 230. This may allow the cooling fluid to be supplied into the cooling fluid distributer 230.

Figure 9:
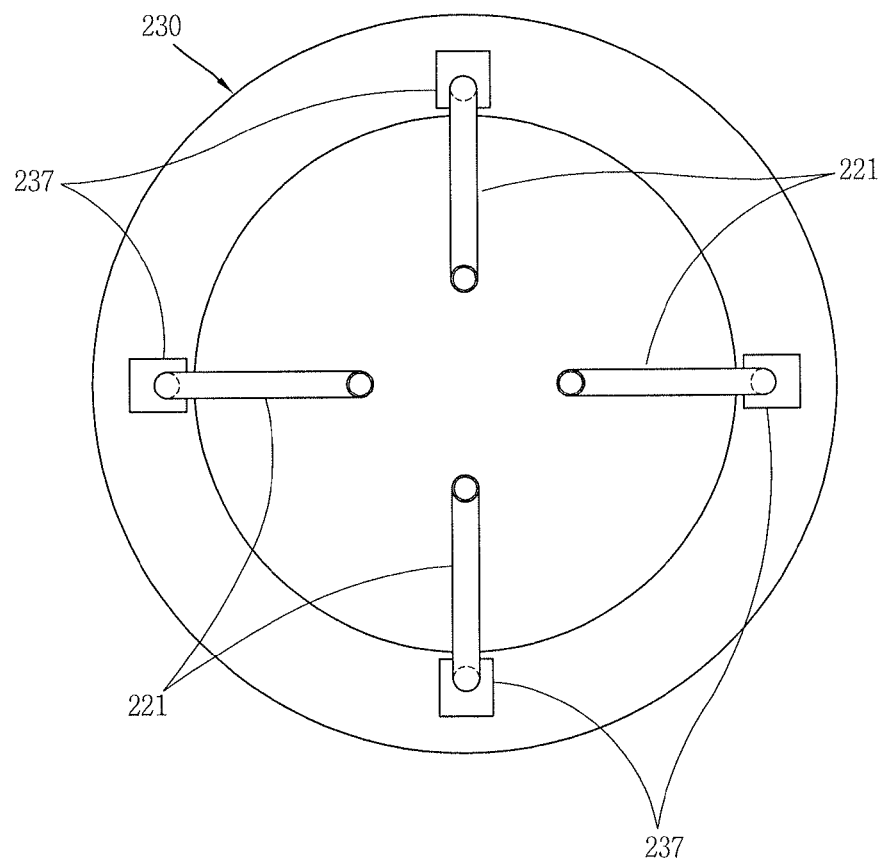
FIG. 9 is a side view of a cooling fluid distributer shown in FIG. 4.

In more detail, the cooling fluid distributer 230, as shown in FIG. 4 and FIG. 9, may include a body 231 having an accommodating space therein with an opening at one side, and a cover 235 coupled to the body 231 to shield the opening of the body 231. The connection space where the ends of the superconducting wires 161 drawn out of the tube 141 are connected to one another may be formed within the body 231.

At least one tube connecting portion 232 through which the tubes 141 communicate with each other may be disposed at the body 231.

At least one cooling fluid supply pipe connecting portion 237 communicating with the cooling fluid supply pipe 221 may be disposed at the cover 235.

The cooling fluid supply pipe 221 may be installed to be received within the rotary shaft 121, more particularly, the second shaft portion 230 at the right in the drawing.

The cooling fluid collector 240 may be located at the other end of the rotor winding 140 (for example, at the left end in the drawing).

The cooling fluid collector 240, for example, may be formed to have a shape of a circular tube or a disk having an accommodating space for the cooling fluid therein.

An end of each tube 141 may communicate with one side of the cooling fluid collector 240, such that the cooling fluid flowed through each tube 141 can be collected.

Figure 10:
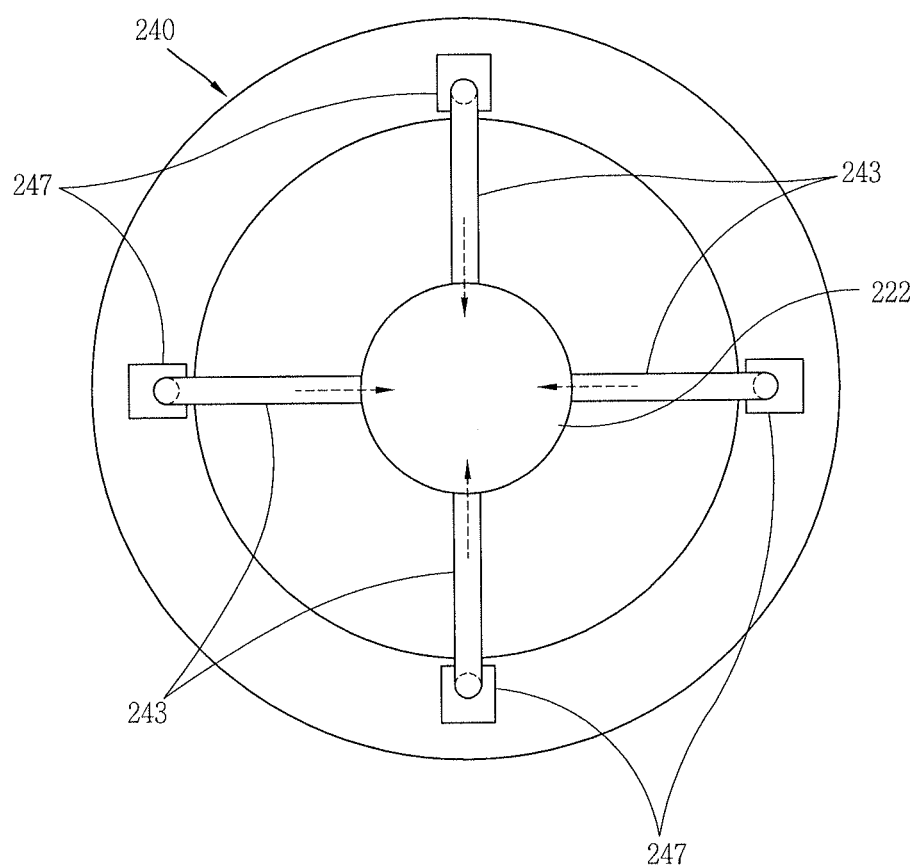
FIG. 10 is a side view of a cooling fluid collector shown in FIG. 4.

In more detail, the cooling fluid collector 240, as shown in FIG. 4 and FIG. 10, may include a body 241 having an accommodating space with an opening at one side, and a cover 245 coupled to block the opening of the body 241.

At least one tube connecting portion 242 through which the tubes 141 communicate with each other may be disposed at the body 241.

A connection space, in which the superconducting wires 161 drawn out of the tube 141 are coupled to one another, may be formed within the body 241.

A plurality of branch collecting pipes 243 may be connected to the body 241 or the cover 245 for collecting the cooling fluid therein. Each branch collecting pipe 243 may be joined (coupled) to the cooling fluid collecting pipe 222 at a central area thereof.

The cooling fluid collecting pipe 222 may be located inside the rotary shaft 121.

Here, regarding the cooling fluid distributer 230 and the cooling fluid collector 240, each body 231, 241 may first be coupled to the tubes 141, the superconducting wires 161 drawn out from both sides of the tubes 141 may be connected together, and then the corresponding cover 235, 245 may be coupled to each body 231, 241.

Meanwhile, a slip ring 251 for supplying an exciting current to the superconducting wires 161 may be disposed, for example, on one area of the rotary shaft 121. Lead wires 253 which allow a current to flow on the slip ring 251 and the superconducting wires 161 may be disposed between the slip ring 251 and the superconducting wires 161.

Also, a sealing device (for example, ferrofluid magnetic sealing device) (not shown) may be disposed on another area of the rotary shaft 121 to maintain the vacuum state of the rotary shaft 121 and prevent the leakage of the cooling fluid.

With the configuration, when power is turned on, an exciting current may be supplied to the superconducting wires 161. When the rotary shaft 121 starts to rotate by a driving unit, a current may be generated on the stator winding 115 by electromagnetic induction.

When power is on, the cooling fluid may be supplied to the rotor winding 140.

In more detail, the cooling fluid supplied along the cooling fluid supply pipe 221 may be introduced into the cooling fluid distributer 230.

The cooling fluid introduced into the cooling fluid distributer 230 may be introduced into each tube 141 communicating with the cooling fluid distributer 230.

The cooling fluid introduced into each tube 141 may directly contact the superconducting wires 161 to prevent heat generation of the superconducting wires 161, thereby maintaining the superconducting wires 161 at a preset temperature which is very low.

The cooling fluid flowed to the other end of the tube 141 may be introduced into the cooling fluid collector 240 and collected.

The cooling fluid collected by the cooling fluid collector 240 may be collected via the cooling fluid collecting pipe 222.

Meanwhile, the superconducting wire 161 may be implemented as a high temperature superconducting thin film with a multi-layered structure.

One exemplary embodiment of the superconducting wire 161 according to the present disclosure may include an upper layer having a superconducting layer, an upper stabilizer layer and a cap layer laminated on the superconducting layer, and a lower layer having a buffer layer and a metal substrate laminated beneath the superconducting layer.

Hereinafter, description will be given of a high temperature superconducting film with a multi-layered structure as a superconducting wire according to the present disclosure with reference to FIGS. 11 and 12.

Figure 11:
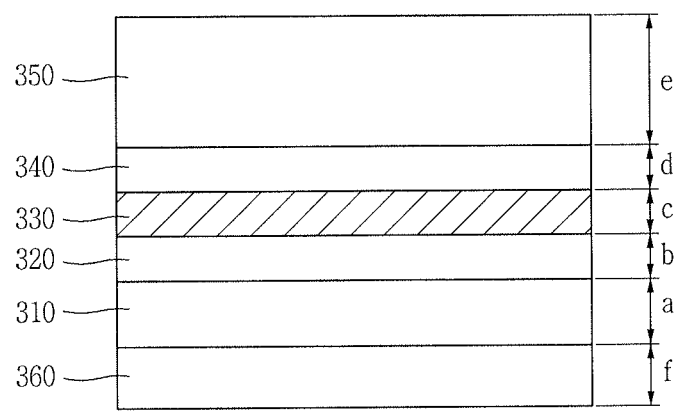
FIG. 11 is a sectional view showing a structure of a superconducting wire shown in FIG. 4.

FIG. 11 shows one exemplary structure of a high temperature superconducting film according to the present disclosure. The high temperature superconducting film with the multi-layered structure according to this exemplary embodiment may also be divided into an upper layer and a lower layer based on a superconducting layer.

The upper layer may include an upper stabilizer layer 350 and a cap layer 340 laminated on the superconducting layer 330. Referring to FIG. 11, the cap layer 340 may be laminated on the superconducting layer 330 and the upper stabilizer layer 350 may be laminated on the cap layer 340.

The cap layer 340 may be made of a metal such as silver (Ag) and the like. The upper stabilizer layer 350 may be made of a metal which is different from a material forming the superconducting layer 330. The upper stabilizer layer 350 may serve to protect the superconducting film by making a current more than a threshold current flow through a stabilizer when the current flows on a superconductor. As one example, the upper stabilizer layer 350 may be made of copper (Cu), brass or stainless (SUS).

Figure 1:
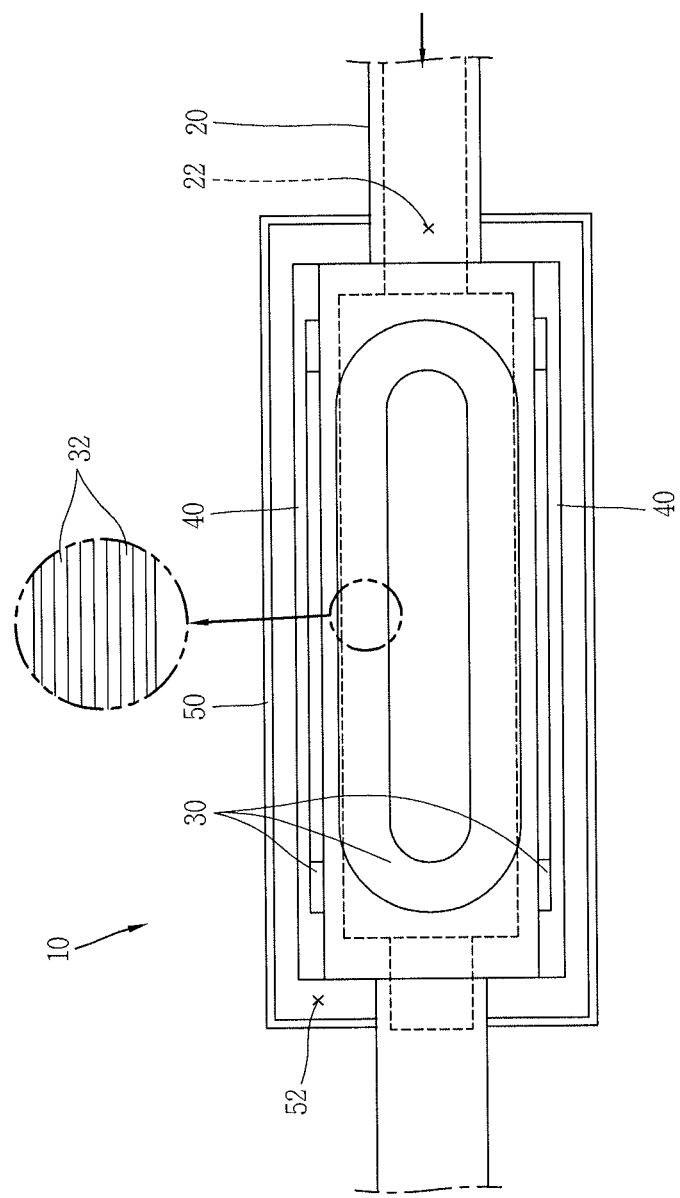
FIG. 1 is a side view of a rotor for a superconducting rotating electrical machine according to the related art.
Figure 2:
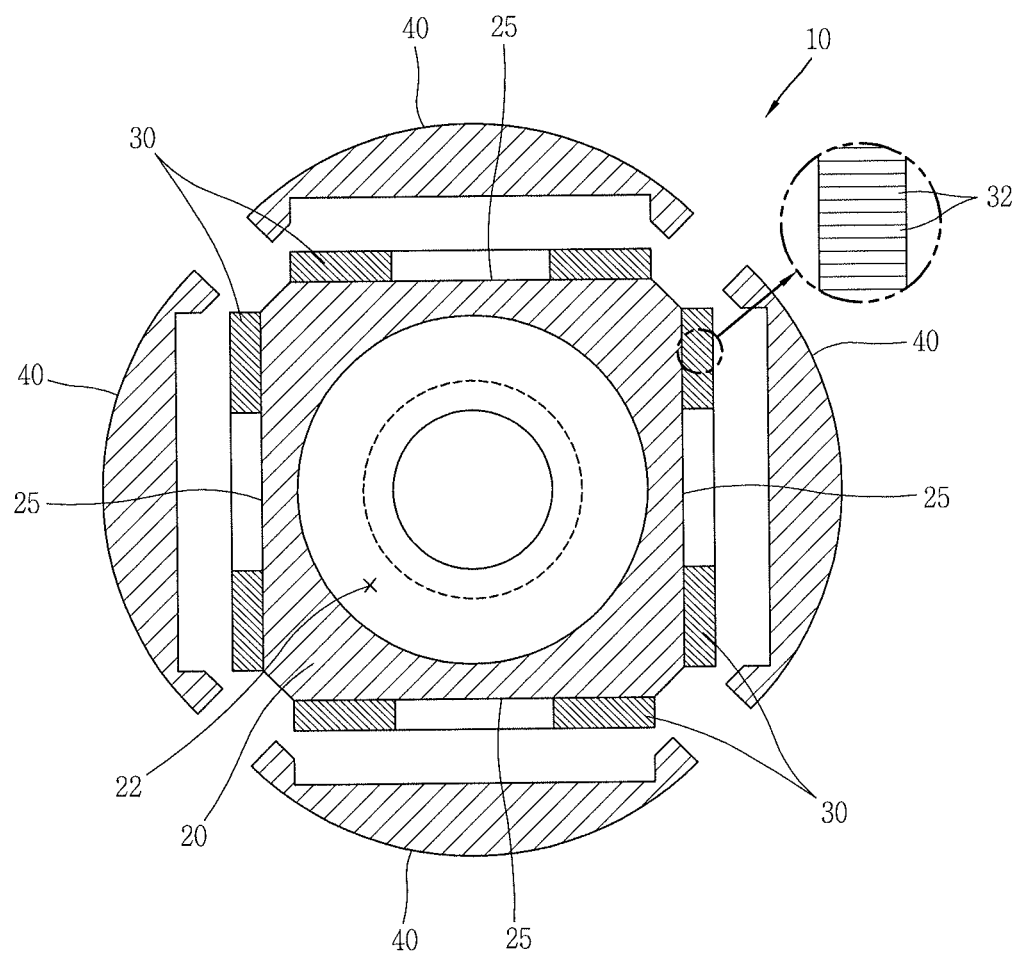
FIG. 2 is a sectional view showing main parts of FIG. 1.
Figure 3:
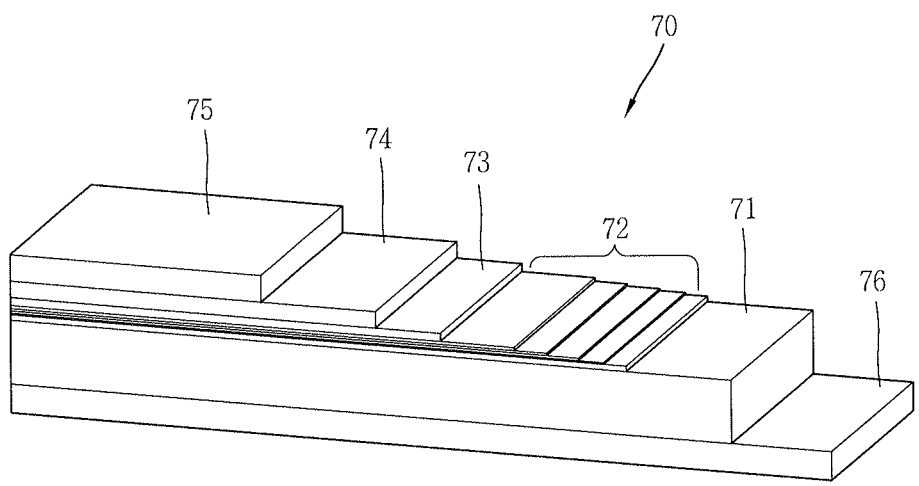
FIG. 3 is a schematic view showing a structure of a general high temperature superconducting film according to the related art.

The lower layer may include a buffer layer 320 and a metal substrate 310 laminated beneath the superconducting layer 330. Referring to FIG. 2, the buffer layer 320 may be laminated beneath the superconducting layer 330 and the metal substrate 310 may be laminated beneath the buffer layer 320.

The buffer layer 320 which is to deposit the ceramic superconducting layer 330 on the metal substrate 310 may be formed as a multi-layered oxide layer having a layered structure. The oxide layer may be laminated on the metal substrate 310 in the depositing manner.

In FIG. 11, it is assumed that a thickness of the metal substrate 310 is 'a', a thickness of the buffer layer 320 is 'b', a thickness of the superconducting layer 330 is 'c', a thickness of the cap layer 340 is 'd' and a thickness of the upper stabilizer layer 350 is 'e'. In the high temperature superconducting film with the multi-layered structure according to this exemplary embodiment, the thickness of the upper layer may be 'e+d' and the thickness of the lower layer may be 'a+b' based on the superconducting layer 330.

The multi-layered high temperature superconducting film may be configured such that the thickness of the upper layer and the thickness of the lower layer are the same as each other. That is, the multi-layered high temperature superconducting film may be formed by a structural relationship of 'e+d=a+b'.

With the configuration, the superconducting layer may be located in the middle between the upper layer and the lower layer, and the upper layer and the lower layer may have a symmetrical thickness with each other. Accordingly, the thickness of the upper layer may be the same as that of the lower layer based on the superconducting layer. This may prevent bending of the metal substrate included in the lower layer, allowing the metal substrate to remain flat. Therefore, cracks may be prevented from being generated on the superconducting layer due to the bending of the metal substrate, which acts as a cause of deterioration of the superconducting layer.

Meanwhile, the formation of the aforementioned structure may be realized by adjusting the thickness of the upper stabilizer layer 350. That is, for adjusting the thickness of the metal layer or the superconducting layer having a fixed thickness, it may not be efficient in view of costs or performance. Hence, the structure can be efficiently formed in a manner of adjusting the thickness of the upper stabilizer layer 350 laminated on the uppermost layer, whose thickness can be easily adjusted using a material requiring for a relatively low cost.

Figure 12:
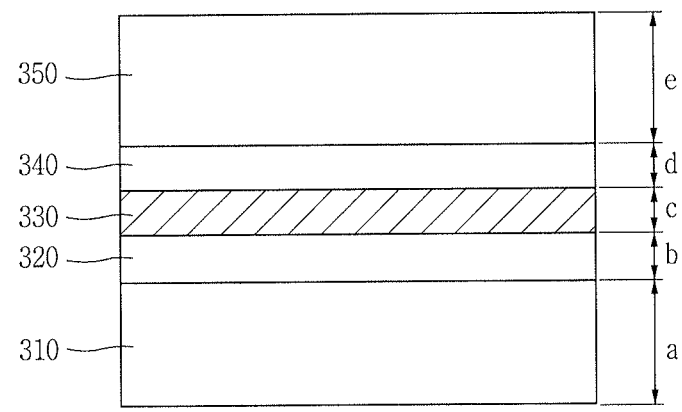
FIG. 12 is a sectional view of another exemplary embodiment of the superconducting wire shown in FIG. 4.

FIG. 12 shows a structure of another exemplary embodiment of a high temperature superconducting film according to the present disclosure. The high temperature superconducting film with the multi-layered structure according to this exemplary embodiment may be divided into an upper layer and a lower layer based on a superconducting layer.

The upper layer may include an upper stabilizer layer 350 and a cap layer 340 laminated on the superconducting layer 330. Referring to FIG. 12, the cap layer 340 may be laminated on the superconducting layer 330, and the upper stabilizer layer 350 may be laminated on the cap layer 340.

The lower layer may include a buffer layer 320, a metal substrate 310 and a lower stabilizer layer 360 laminated beneath the superconducting layer 330. Referring to FIG. 12, the buffer layer 320 may be laminated beneath the superconducting layer 330, the metal substrate 310 may be laminated beneath the buffer layer 320, and the lower stabilizer layer 360 may be laminated beneath the metal substrate 310.

In FIG. 12, it is assumed that a thickness of the metal substrate 310 is 'a', a thickness of the buffer layer 320 is 'b', a thickness of the superconducting layer 330 is 'c', a thickness of the cap layer 340 is 'd', a thickness of the upper stabilizer layer 350 is 'e' and a thickness of the lower stabilizer layer 360 is 'f'. Here, in the high temperature superconducting film with the multi-layered structure according to this exemplary embodiment, the thickness of the upper layer may be 'e+d' and the thickness of the lower layer may be 'a+b+f' based on the superconducting layer 330.

The multi-layered high temperature superconducting film may be configured such that the thickness of the upper layer is the same as the thickness of the lower layer. That is, the multi-layered high temperature superconducting film may be formed by a structural relationship of 'e+d=a+b+f'.

As similar to the aforementioned exemplary embodiment, the superconducting layer may be located in the middle between the upper layer and the lower layer, and the upper layer and the lower layer may have a symmetrical thickness with each other. Accordingly, the thickness of the upper layer may be the same as that of the lower layer based on the superconducting layer. This may prevent bending of the metal substrate included in the lower layer, allowing the metal substrate to remain flat. Therefore, cracks may be prevented from being generated on the superconducting layer, caused due to the bending of the metal substrate, which acts as a cause of deterioration of the superconducting layer.

The formation of the structure may be realized by adjusting the thicknesses of the upper stabilizer layer 350 and the lower stabilizer layer 360. That is, adjusting the thickness of the metal substrate or the superconducting layer having a fixed thickness may not be efficient in view of costs or performance. Hence, the structure can be efficiently formed in a manner of adjusting the thicknesses of the upper stabilizer layer 350 and the lower stabilizer layer 360 laminated on the uppermost and lowermost layers, whose thickness can be easily adjusted.

Meanwhile, a method for manufacturing a high temperature superconducting film with a multi-layered structure according to the present disclosure may include sequentially laminating the buffer layer 320 and the superconducting layer 330 on the metal substrate 310, laminating a cap layer 340 on the laminated superconducting layer 330, and laminating an upper stabilizer layer 350 and a lower stabilizer layer 360 on the cap layer 340 and beneath the meal substrate 310, respectively.

The structures according to the exemplary embodiments may be realized by adjusting the thicknesses of the upper stabilizer layer 350 and the lower stabilizer layer 360. Therefore, the laminating of the stabilizer layers may be carried out by adjusting the thicknesses of the upper stabilizer layer and the lower stabilizer layer such that the sum of the thicknesses of the upper stabilizer layer and the cap layer can be the same as the sum of the thicknesses of the buffer layer, the metal substrate and the lower stabilizer layer. Here, it may be allowed to adjust a thickness of only one of the upper stabilizer layer and or the lower stabilizer layer.

As described above, in accordance with one exemplary embodiment, a rotor winding may include tubes, superconducting wires inserted into the tubes, and a cooling fluid flowing through the tubes. This structure may allow the superconducting wires to exchange heat directly with a refrigerant, resulting in improving heat exchange efficiencies of the superconducting wires.

Also, a predetermined number of superconducting wires may be accommodated within the tube, preventing deformation of the superconducting wires.

The direct heat exchange between the superconducting wires and the refrigerant may facilitate cooling of the superconducting wires, and the accommodation of the predetermined number of superconducting wires within the tubes may prevent the deformation of the superconducting wires, which may allow for providing intermediate and large capacity superconducting rotating electrical machines, whose capacities are relatively larger than a small capacity superconducting rotating electrical machine, as well as the small capacity superconducting rotating electrical machine.

Upper and lower stabilizer layers may be adjusted in thickness to make a bent metal substrate flat, which may prevent cracks from being generated on the superconducting layer and the buffer layer which causes deterioration.

The prevention of the cracks on the superconducting layer may result in improvement of threshold current and current carrying properties among main properties of a high temperature superconducting film.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A superconducting rotating electrical machine comprising:
   a stator; and
   a rotor rotatable with respect to the stator, the rotor having a rotary shaft and a rotor winding,
   wherein the rotor winding comprises:
   tubes disposed on a circumference of the rotary shaft and each forming a passage for a cooling fluid therein;
   superconducting wires accommodated within the tubes;
   a cooling fluid flowing through the inside of the tubes, and
   spacers located within the tubes to space the superconducting wires apart from one another.

2. The machine of claim 1, wherein each of the spacers comprises through holes to allow the cooling fluid to flow therethrough.

3. A superconducting rotating electrical machine comprising:
   a stator; and
   a rotor rotatable with respect to the stator, the rotor having a rotary shaft and a rotor winding,
   wherein the rotor winding comprises:
   tubes disposed on a circumference of the rotary shaft and each forming a passage for a cooling fluid therein;
   superconducting wires accommodated within the tubes;
   a cooling fluid flowing through the inside of the tubes; and
   a tube supporting unit to support the tubes with spacing the tubes apart from the rotary shaft,
   wherein the tube supporting unit is provided in plurality, the plurality of tube supporting units being arranged with predetermined intervals, and
   wherein each of the tube supporting units comprises:
   a supporter having a rotary shaft receiving hole for receiving the rotary shaft therein, and tube receiving portions formed on a circumference of the rotary shaft receiving hole for receiving the tubes therein; and
   a fixing member protruding from the circumference of the rotary shaft to fix the supporter.

4. The machine of claim 3, further comprising:
   at least one cooling fluid supply pipe connected to each tube to supply the cooling fluid thereinto; and
   at least one cooling fluid collecting pipe connected to the other side of the tube to collect the cooling fluid.

5. The machine of claim 4, wherein the rotary shaft forms an inner accommodating space, and the cooling fluid supply pipe or the cooling fluid collecting pipe is disposed within the rotary shaft.

6. The machine of claim 3, wherein the rotor comprises an enclosure to accommodate a part of the rotary shaft and the rotor winding therein.

7. A superconducting rotating electrical machine comprising:
   a stator; and
   a rotor rotatable with respect to the stator, the rotor having a rotary shaft and a rotor winding,
   wherein the rotor winding comprises:
   tubes disposed on a circumference of the rotary shaft and each forming a passage for a cooling fluid therein;
   superconducting wires accommodated within the tubes; and
   a cooling fluid flowing through the inside of the tubes,
   wherein the rotary shaft forms an inner accommodating space,
   wherein the rotary shaft comprises a first shaft portion located at a central portion thereof, and second shaft portions connected to both ends of the first shaft portion.

8. The machine of claim 7, wherein the first shaft portion has an outer diameter greater than that of the second shaft portion.

9. The machine of claim 8, wherein the first shaft portion comprises a cylindrical portion, and disk portions disposed on both ends of the cylindrical portion in a radial direction.

10. The machine of claim 7, wherein the rotor winding is disposed on a circumference of the first shaft portion.

11. A superconducting rotating electrical machine comprising:
    a stator; and
    a rotor rotatable with respect to the stator, the rotor having a rotary shaft and a rotor winding,
    wherein the rotor winding comprises:
    tubes disposed on a circumference of the rotary shaft and each forming a passage for a cooling fluid therein;
    superconducting wires accommodated within the tubes; and
    a cooling fluid flowing through the inside of the tubes,
    wherein the superconducting wire is implemented as a multi-layered high temperature superconducting film.

12. The machine of claim 11, wherein the high temperature superconducting film comprises:
    a superconducting layer;
    an upper layer having an upper stabilizer layer and a cap layer laminated on the superconducting layer; and
    a lower layer having a buffer layer and a metal substrate laminated beneath the superconducting layer,
    wherein the upper layer and the lower layer have the same thickness.

13. The machine of claim 12, wherein the superconducting layer is located in the middle between the upper layer and the lower layer such that the upper layer and the lower layer are symmetrical in thickness.

14. The machine of claim 12, wherein the lower layer further comprises a lower stabilizer layer laminated beneath the metal substrate.

15. The machine of claim 14, wherein the buffer layer of the lower layer is laminated adjacent to the superconducting layer below the superconducting layer,
- wherein the metal substrate of the lower layer is laminated beneath the buffer layer, and
- wherein the lower stabilizer layer of the lower layer is laminated beneath the metal substrate.

16. The machine of claim 12, wherein the cap layer of the upper layer is laminated adjacent to the superconducting layer above the superconducting layer, and
- wherein the upper stabilizer layer of the upper layer is laminated on the cap layer.

17. A method for manufacturing a multi-layered high temperature superconducting film for the superconducting rotating electrical machine according to claim 14, the method comprising:
- sequentially laminating a buffer layer and a superconducting layer on the metal substrate;
- laminating a cap layer on the superconducting layer; and
- laminating an upper stabilizer layer and a lower stabilizer layer on the cap layer and beneath the metal substrate, respectively,
- wherein the laminating of the stabilizer layers is carried out to arrange the stabilizer layers by adjusting thicknesses of the stabilizer layers such that sum of thicknesses of the upper stabilizer layer and the cap layer is the same as the sum of thicknesses of the buffer layer, the metal substrate and the lower stabilizer layer.

* * * * *